United States Patent [19]

Yamakawa et al.

[11] Patent Number: 4,733,126
[45] Date of Patent: Mar. 22, 1988

[54] PHOSPHOR AND FLUORESCENT LAMP USING THE SAME

[75] Inventors: Masahiko Yamakawa, Yokohama; Kenji Terashima, Chigasaki, both of Japan

[73] Assignee: Kabushiki Kaisha Toshiba, Kawasaki, Japan

[21] Appl. No.: 36,452

[22] Filed: Apr. 9, 1987

[30] Foreign Application Priority Data

Apr. 16, 1986 [JP] Japan .................................. 61-86183
Sep. 5, 1986 [JP] Japan .................................. 61-207672

[51] Int. Cl.$^4$ ...................... C09K 11/465; H01J 61/44
[52] U.S. Cl. ............................. 313/487; 252/301.4 F; 252/301.4 R; 313/486
[58] Field of Search ................... 252/301.4 F, 301.4 R; 313/486, 487

[56] References Cited

U.S. PATENT DOCUMENTS

| 3,577,169 | 5/1971 | Barry | 252/301.4 F |
| 3,839,219 | 10/1974 | Verstegen et al. | 252/301.4 F |
| 4,150,321 | 4/1979 | Schetters et al. | 252/301.4 F |
| 4,161,457 | 7/1979 | Takahashi et al. | 252/301.4 R |
| 4,216,408 | 8/1980 | Verstegen et al. | 313/468 |
| 4,315,191 | 2/1982 | Konijnendijk et al. | 252/301.4 F |
| 4,590,405 | 5/1986 | Hoeks et al. | 313/486 |

FOREIGN PATENT DOCUMENTS

| 53-10568 | 1/1978 | Japan | 313/487 |
| 54-124581 | 9/1979 | Japan | 313/487 |

Primary Examiner—Jack Cooper
Attorney, Agent, or Firm—Cushman, Darby & Cushman

[57] ABSTRACT

According to the present invention, there is provided a phosphor represented by a general formula $(Ba_wCa_xMg_yEu_z)O \cdot aAl_2O_3 \cdot bSiO_2$ where $0.1 \leq w \leq 0.5$, $0.0004 \leq x \leq 0.0020$, $0.1 \leq y \leq 0.8$, $0.03 \leq z \leq 0.10$, $w+x+y+z=1$, $1.5 \leq a \leq 4.5$, and $0.0005 \leq b \leq 0.0030$. The present invention provides a blue-color light-emitting aluminate phosphor which has a high emission output and a low decrease in its emission intensity during use, and a fluorescent lamp using the same.

3 Claims, 1 Drawing Figure

F I G. 1
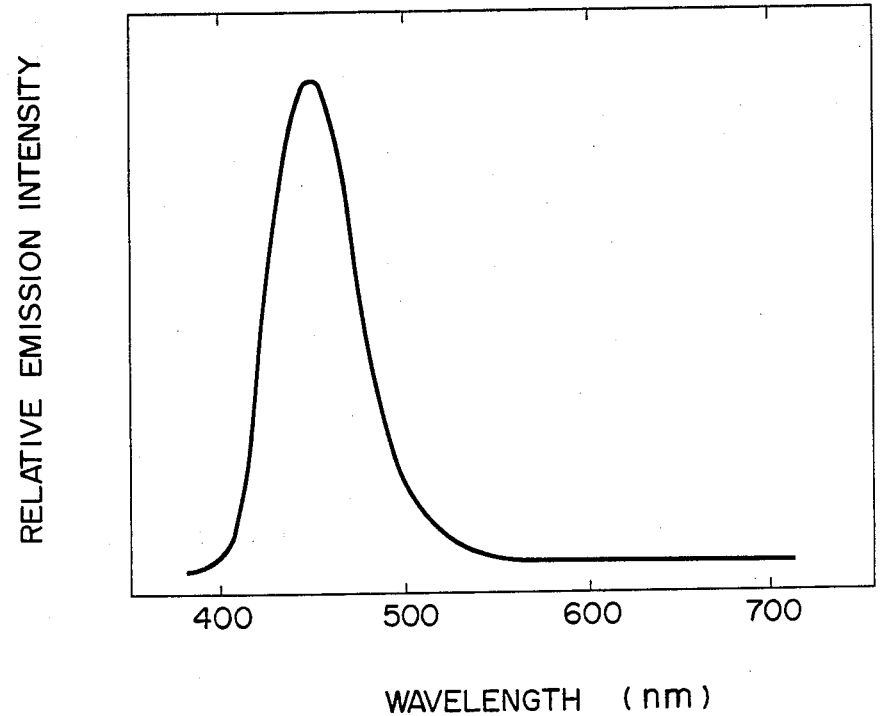

PHOSPHOR AND FLUORESCENT LAMP USING THE SAME

BACKGROUND OF THE INVENTION

The present invention relates to a blue-color light-emitting aluminate phosphor and a fluorescent lamp using the same.

Recently, demand has arisen for general illumination fluorescent lamps having high output and high color-rendering properties. This demand is met by three-band type fluorescent lamps wherein blue, green, and red phosphors, having emission spectrum distributions of relatively narrow wavelength ranges, are mixed in an appropriate mixing ratio.

A recent three-band type fluorescent lamp uses an aluminate phosphor as a blue-color light-emitting component. However, a europium-activated aluminate phosphor [(Ba,Eu)Mg$_2$Al$_{16}$O$_{27}$] (Japanese Patent Publication (Kokoku) No. 52-22836) as a known blue phosphor is not satisfactory, since its emission intensity decreases during use. Other europium-activated aluminate phosphors [(Ba,Eu)O.eAl$_2$O$_3$.fy$_2$O$_3$] (Japanese Patent Disclosure (Kokai) No. 60-139784) and [Ba$_{1-g-h}$Sr$_g$Mg$_i$.Al$_j$O$_{1+i+j/2}$:Eu$_h^{2+}$] (Japanese Patent Disclosure (Kokai) No. 56-86982) are also not satisfactory since their emission intensities are low and decrease during use.

The emission colors of the respective phosphors of these types of fluorescent lamp differ greatly. When the emission outputs (emission inensities) of the respective phosphors decrease while the lamp is in use, color deviation occurs, degrading the color rendering properties.

Japanese Patent Disclosure (Kokai) No. 57-207678 discloses a fluorescent lamp having a combination of 3(M,Eu)$_3$(PO$_4$)$_2$.m'Cl$_2$ or k(M$_{1-o}$Eu$_o$O).lP$_2$O$_5$mM'X$_2$.nB$_2$O$_8$ as a blue phosphor, (Re$_{1-p-q-r}$Tb$_p$Ce$_q$As$_r$)$_2$O$_3$μSiO$_2$.vP$_2$O$_5$ as a green phosphor, and (Y,Eu)$_2$O$_3$ as a red phosphor. With this lamp, however, color deviation occurs during use, due to a difference in the degradation rates of the respective phosphors, thus a decrease in the total luminous flux intensity of the lamp is large.

SUMMARY OF THE INVENTION

The present invention has been developed to solve the above problems, and has as its object to provide a blue-color light-emitting aluminate phosphor which has a high emission output and a low decrease in its emission intensity during use, and a fluorescent lamp using the same.

The phosphor of the present invention is a blue-color light-emitting aluminate phosphor represented by a general formula (Ba$_w$Ca$_x$Mg$_y$Eu$_z$)O.aAl$_2$O$_3$.bSiO$_2$ where $0.1 \leq w \leq 0.5$, $0.0004 \leq x \leq 0.0020$, $0.1 \leq y \leq 0.8$, $0.03 \leq z \leq 0.10$, $w+x+y+z+1$, $1.5 \leq a \leq 4.5$, and $0.0005 < b \leq 0.0030$.

It is preferable that a satisfies $2.0 \leq a \leq 3.0$ and that x satisfies $0.0006 \leq x \leq 0.0015$.

Eu can be partially substituted by Mn. The substitution ratio of Mn is twice or less than Eu in molar ratio. In this case, coefficient z depends on the total amount of Eu and Mn.

The phosphor (Ba$_w$Ca$_x$Mg$_y$Eu$_z$)O.aAl$_2$O$_3$.bSiO$_2$ of the present invention can be synthesized as follows:

In selecting phosphor materials, at least one member selected from the barium compound group consisting of barium oxide, barium hydroxide, barium carbonate, and so on can be used as a barium source; at least one member selected from the calcium compound group consisting of calcium oxide, calcium hydroxide, calcium carbonate and so on can be used as a calcium source; at least one member selected from the magnesium compound group consisting of magnesium oxide, magnesium hydroxide, magnesium carbonate, and so on can be used as a magnesium source; at least one member selected from the europium compound group consisting of europium oxide, europium fluoride, and so on can be used as a europium source; at least one member selected from an aluminum compound group consisting of aluminum oxide, aluminum hydroxide, and so on can be used as an aluminum source; and at least one member selected from the silicon compound group consisting of silicon dioxide and so on can be used as a silicon source.

Predetermined amounts of the above materials are weighed and mixed thoroughly. The mixture is put in a refractory container and sintered in air at 1,200° to 1,600° C. for 3 to 4 hours. The obtained sintered product is pulverized and treated by washing with water and so on.

The powder obtained by pulverization is dried and put in the refractory container once again, and sintered in a reducing atmosphere at 1,400° to 1,600° C. for 3 to 4 hours. When the sintered product is pulverized and treated by washing with water and so on, a blue-color light-emitting aluminate phosphor of the present invention can be obtained.

FIG. 1 shows a spectrum distribution of the blue-color light-emitting aluminate phosphor of the present invention. It can be seen from FIG. 1 that the phosphor of the present invention has an emission spectrum of a narrow wavelength range in the vicinity of 450 nm.

The fluorescent lamp according to the present invention is obtained by coating, on the inner surface of a glass bulb, a mixture of the blue phosphor (first phosphor); a second phosphor having an emission spectrum in a visible green color range and represented by a general formula Ln$_2$O$_3$.c(Mg$_{1-u}$Ca$_u$)O.d[(Al$_2$O$_3$)$_{1-v}$.(SiO$_2$)$_v$] (where Ln is at least one element selected from the group consisting of lanthanum, gadolinium, yttrium, cerium, and terbium, and $1.5 \leq c \leq 5.0$, $2.5 \leq d \leq 14.0$, $0.001 \leq u \leq 0.005$, and $0.0002 \leq v \leq 0.0010$); and a third phosphor having an emission spectrum in a visible red color range and represented by a general formula (Y$_{1-t}$Eu$_t$)$_2$O$_3$ (where $0.020 \leq t \leq 0.065$). The first, second, and third phosphors are contained at ratios of 0.2 to 35% by weight, 35 to 60% by weight, and 30 to 60% by weight, respectively, with respect to 100% by weight of the mixture.

If the mixing ratios of the first, second, and third phosphors of the present invention fall outside the above ranges, the color rendering properties are decreased.

The second phosphor is disclosed in Japanese Patent Application No. 61-120208 by the present inventors.

BRIEF DESCRIPTION OF THE DRAWING

FIG. 1 shows the emission spectrum of the blue-color phosphor according to the present invention.

DETAILED DESCRIPTION OF THE PREFERRED EMBODIMENTS

EXAMPLE 1

| | | |
|---|---|---|
| Barium oxide | BaO | 68.85 g |
| Calcium hydroxide | Ca(OH)$_2$ | 0.07 |

| | | -continued |
|---|---|---|
| Magnesium hydroxide | Mg(OH)$_2$ | 29.17 |
| Europium oxide | Eu$_2$O$_3$ | 8.80 |
| Aluminum oxide | Al$_2$O$_3$ | 254.90 |
| Silicon dioxide | SiO$_2$ | 0.06 |

The above materials were mixed thoroughly. The obtained mixture was sintered in air at 1.350° C. for 4 hours. The sintered product was pulverized and washed with water. The powder obtained by pulverization was dried and sintered in a reducing atmosphere at 1,400° C. for 4 hours. Finally, the sintered powder was pulverized, washed with water, and dried again to obtain a phosphor.

The composition of the obtained phosphor was (Ba$_{0.449}$Ca$_{0.001}$Mg$_{0.5}$Eu$_{0.05}$)O.2.5Al$_2$O$_3$.0.001SiO$_2$. The emission intensities of this phosphor, under excitation by the mercury bright line of 254 nm, were 110% and 120% those of conventional blue-color light-emitting aluminum phosphors (Ba,Eu)Mg$_2$Al$_{16}$O$_{27}$ and (Ba,Eu)O.eAl$_2$O$_3$.fY$_2$O$_3$, respectively. Its emission intensity after the lamp had been ON for 1,000 hours was 180% that of (Ba,Eu)O.eAl$_2$O$_3$.fY$_2$O$_3$.

EXAMPLE 2

| Barium carbonate | BaCO$_3$ | 39.08 g |
|---|---|---|
| Calcium oxide | CaO | 0.11 |
| Magnesium hydroxide | Mg(OH)$_2$ | 40.83 |
| Europium oxide | Eu$_2$O$_3$ | 17.60 |
| Aluminum hydroxide | Al(OH)$_3$ | 546.00 |
| Silicon dioxide | SiO$_2$ | 0.12 |

The above materials were treated following the same procedures as in Example 1. The composition of the obtained phosphor was (Ba$_{0.198}$Ca$_{0.002}$Mg$_{0.7}$Eu$_{0.1}$)O.3.5Al$_2$O$_3$.0.002SiO$_2$. The emission intensities of this phosphor, under excitation by the mercury bright line of 254 nm, was 114% that of (Ba,Eu)O.eAl$_2$O$_3$.fY$_2$O$_3$, and was 135% that thereof after the lamp had been ON for 1,000 hours.

EXAMPLE 3

| Barium hydroxide | Ba(OH)$_2$ | 34.27 g |
|---|---|---|
| Calcium fluoride | CaF$_2$ | 0.12 |
| Magnesium carbonate | MgCO$_3$ | 62.27 |
| Europium fluoride | EuF$_3$ | 12.54 |
| Aluminum oxide | Al$_2$O$_3$ | 203.92 |
| Silicon dioxide | SiO$_2$ | 0.18 |

The above materials were treated following the same procedures as in Example 1. The composition of the obtained phosphor was (Ba$_{0.2}$Ca$_{0.0015}$Mg$_{0.7385}$Eu$_{0.06}$)O.2.0Al$_2$O$_3$.003SiO$_2$. The emission intensity of this phosphor, under excitation by the mercury bright line of 254 nm, was 118% that of (Ba,Eu)O.eAl$_2$O$_3$.fY$_2$O$_3$, and was 155% that thereof after the lamp had been ON for 1,000 hours.

Table 1 compares the emission intensities of the phosphors (Examples 1 to 3, Examples 4 to 16, in accordance with the same manufacturing method as in Examples 1 to 3) and conventional blue-color light-emitting aluminum phosphors (Controls 1 and 2), and their respective degradations. It can be seen from Table 1 that a phosphor of the present invention, represented by a general formula (Ba$_w$Ca$_x$Mg$_y$Eu$_z$)O.aAl$_2$O$_3$.bSiO$_2$, has higher emission intensities immediately after excitation and after the lamp has been ON for 1,000 hours. It can also be seen that these high emission intensities can be obtained when 2.0<a−3.0 or 0.0006<x<0.0015.

TABLE 1

| No. | W | X | Y | Z | a | b | Emission Intensity After 0 hrs. | Emission Intensity After 1,000 hrs. |
|---|---|---|---|---|---|---|---|---|
| Example | | | | | | | | |
| 1 | 0.449 | 0.0010 | 0.50 | 0.05 | 2.5 | 0.0010 | 120 | 180 |
| 2 | 0.198 | 0.0020 | 0.70 | 0.10 | 3.5 | 0.0020 | 114 | 135 |
| 3 | 0.2 | 0.0015 | 0.7385 | 0.06 | 2.0 | 0.0030 | 118 | 155 |
| 4 | 0.1496 | 0.0004 | 0.75 | 0.10 | 1.5 | 0.0015 | 110 | 133 |
| 5 | 0.3188 | 0.0012 | 0.60 | 0.08 | 4.5 | 0.0022 | 117 | 148 |
| 6 | 0.3 | 0.0017 | 0.6283 | 0.07 | 3.0 | 0.0005 | 119 | 175 |
| 7 | 0.1492 | 0.0008 | 0.80 | 0.05 | 1.8 | 0.0017 | 115 | 149 |
| 8 | 0.2494 | 0.0006 | 0.65 | 0.10 | 2.3 | 0.0025 | 121 | 183 |
| 9 | 0.5495 | 0.0005 | 0.40 | 0.05 | 3.2 | 0.0008 | 112 | 135 |
| 10 | 0.2 | 0.0013 | 0.7087 | 0.09 | 2.9 | 0.0027 | 123 | 165 |
| 11 | 0.5 | 0.0017 | 0.4903 | 0.08 | 1.6 | 0.0016 | 110 | 130 |
| 12 | 0.3982 | 0.0018 | 0.50 | 0.10 | 4.0 | 0.0030 | 111 | 132 |
| 13 | 0.2585 | 0.0015 | 0.70 | 0.04 | 3.4 | 0.0010 | 118 | 160 |
| 14 | 0.1195 | 0.0005 | 0.80 | 0.08 | 2.8 | 0.0009 | 120 | 170 |
| 15 | 0.4588 | 0.0012 | 0.45 | 0.09 | 4.4 | 0.0013 | 115 | 150 |
| 16 | 0.338 | 0.0020 | 0.60 | 0.06 | 3.7 | 0.0021 | 112 | 141 |
| Control | | | | | | | | |
| 1 | (Ba, Eu)Mg$_2$Al$_{16}$O$_{27}$ | | | | | | 109 | 130 |
| 2 | (Ba, Eu)O.eAl$_2$O$_3$.fY$_2$O$_3$ | | | | | | 100 | 100 |

EXAMPLE 17

Fifteen percent by weight of (Ba$_{0.3}$Ca$_{0.002}$Mg$_{0.6}$Eu$_{0.098}$)O.2.5Al$_2$O$_3$.0.0030SiO$_2$ as a blue phosphor, 50% by weight of (La$_{0.5}$Ce$_{0.3}$Tb$_{0.2}$)$_2$O$_3$.2.0.(Mg$_{0.999}$Ca$_{0.001}$)O.8.0[(Al$_2$O$_3$)$_{0.9996}$(SiO$_2$)$_{0.0004}$[ as a green phosphor, and 35% by weight of (Y$_{0.96}$Eu$_{0.04}$)$_2$O$_3$ as a red phosphor were mixed together. The mixture was coated on the inner surface of a glass bulb to prepare a fluorescent lamp FL22SS/18 of the present invention.

The color of the light emitted by this fluorescent lamp, after it had been ON for 0 hours (immediately after manufacture) was x=0.340 and Y=0.357 on the x, y chromaticity coordinate diagram. After this fluorescent lamp was ON for 500 hours, the color of its light was measured to be x=0.340 and y=0.359. In contrast to this, the color of the light emitted by a lamp according to Control 3 was x=0.340 and y=0.354, after the lamp had been ON for 0 hours, and was x=0.360 and y=0.365, after the lamp had been ON for 500 hours.

The total luminous fluxes (emission outputs) after the lamp had been ON for 500 hours were 102% and 112% those of Control 3, respectively.

As a result, it is apparent that the lamp of Example 17 has less color deviation and a smaller decrease in its emission output than the lamp according to Control 3.

Similar tests were performed by changing the formula and mixing ratio of the respective color phosphors (Examples 18 to 31).

Table 2 shows the results in this case. The fluorescent lamps of the present invention are superior to that of Control 3, in that their color deviation and decrease in emission output are less.

TABLE 2

| No. | Blue Phosphor Composition | Blue Phosphor Mixing Ratio (% by weight) | Green Phosphor Composition | Green Phosphor Mixing Ratio (% by weight) | Red Phosphor Composition | Red Phosphor Mixing Ratio (% by weight) | Emitted Color After 0 hrs. (x, y color Representation) | Emitted Color After 500 hrs. (x, y color Representation) | Total Luminous Flux After 0 hrs. (%) | Total Luminous Flux After 500 hrs. (%) |
|---|---|---|---|---|---|---|---|---|---|---|
| Example | | | | | | | | | | |
| 17 | (Ba$_{0.3}$Ca$_{0.0020}$Mg$_{0.6}$Eu$_{0.0980}$)O.2.5Al$_2$O$_3$.0.0030SiO$_2$ | 15 | (La$_{0.5}$Ce$_{0.3}$Tb$_{0.2}$)$_2$O$_3$.2.0(Mg$_{0.999}$Ca$_{0.001}$)O.8.0[(Al$_2$O$_3$)$_{0.9996}$(SiO$_2$)$_{0.0004}$] | 50 | (Y$_{0.960}$Eu$_{0.040}$)$_2$O$_3$ | 35 | x = 0.338 y = 0.357 | x = 0.340 y = 0.359 | 102 | 112 |
| 18 | (Ba$_{0.449}$Ca$_{0.0010}$Mg$_{0.5}$Eu$_{0.05}$)O.2.5Al$_2$O$_3$.0.0010SiO$_2$ | 10 | (La$_{0.5}$Ce$_{0.3}$Tb$_{0.2}$)$_2$O$_3$.2.5(Mg$_{0.998}$Ca$_{0.002}$)O.5.0[(Al$_2$O$_3$)$_{0.9998}$(SiO$_2$)$_{0.0002}$] | 60 | (Y$_{0.945}$Eu$_{0.055}$)$_2$O$_3$ | 30 | x = 0.340 y = 0.356 | x = 0.341 y = 0.358 | 101 | 110 |
| 19 | (Ba$_{0.198}$Ca$_{0.0020}$Mg$_{0.7}$Eu$_{0.10}$)O.3.5Al$_2$O$_3$.0.0020SiO$_2$ | 5 | (Gd$_{0.6}$Ce$_{0.3}$Tb$_{0.1}$)$_2$O$_3$.3.0(Mg$_{0.999}$Ca$_{0.001}$)O.10[(Al$_2$O$_3$)$_{0.9990}$(SiO$_2$)$_{0.0010}$] | 55 | (Y$_{0.965}$Eu$_{0.035}$)$_2$O$_3$ | 40 | x = 0.341 y = 0.353 | x = 0.343 y = 0.354 | 103 | 109 |
| 20 | (Ba$_{0.2}$Ca$_{0.0015}$Mg$_{0.3385}$Eu$_{0.06}$)O.2.0AlO$_3$.0.0030SiO$_2$ | 20 | (Y$_{0.7}$Ce$_{0.15}$Tb$_{0.15}$)$_2$O$_3$.2.0(Mg$_{0.995}$Ca$_{0.005}$)O.2.5[(Al$_2$O$_3$)$_{0.9998}$(SiO$_2$)$_{0.0002}$] | 35 | (Y$_{0.980}$Eu$_{0.020}$)$_2$O$_3$ | 45 | x = 0.340 y = 0.355 | x = 0.342 y = 0.356 | 100 | 111 |
| 21 | (Ba$_{0.3188}$Ca$_{0.0012}$Mg$_{0.60}$Eu$_{0.08}$)O.4.5Al$_2$O$_3$.0.0022SiO$_2$ | 15 | (Ce$_{0.65}$Tb$_{0.35}$)$_2$O$_3$.1.5(Mg$_{0.999}$Ca$_{0.001}$)O.4.0[(Al$_2$O$_3$)$_{0.9998}$(SiO$_2$)$_{0.0002}$] | 40 | (Y$_{0.935}$Eu$_{0.065}$)$_2$O$_3$ | 45 | x = 0.339 y = 0.352 | x = 0.340 y = 0.355 | 102 | 112 |
| 22 | (Ba$_{0.3}$Ca$_{0.0017}$Mg$_{0.6283}$Eu$_{0.07}$)O.3.0Al$_2$O$_3$.0.0005SiO$_2$ | 10 | (La$_{0.7}$Tb$_{0.3}$)$_2$O$_3$.5.0(Mg$_{0.996}$Ca$_{0.004}$)O.8.0[(Al$_2$O$_3$)$_{0.9997}$(SiO$_2$)$_{0.0003}$] | 45 | (Y$_{0.975}$Eu$_{0.025}$)$_2$O$_3$ | 45 | x = 0.342 y = 0.350 | x = 0.345 y = 0.353 | 101 | 110 |
| 23 | (Ba$_{0.1492}$Ca$_{0.0008}$Mg$_{0.8}$Eu$_{0.05}$)O.1.8Al$_2$O$_3$.0.0017SiO$_2$ | 10 | (Gd$_{0.8}$Tb$_{0.2}$)$_2$O$_3$.3.5(Mg$_{0.998}$Ca$_{0.002}$)O.12[(Al$_2$O$_3$)$_{0.9998}$(SiO$_2$)$_{0.0002}$] | 60 | (Y$_{0.950}$Eu$_{0.050}$)$_2$O$_3$ | 30 | x = 0.341 y = 0.358 | x = 0.344 y = 0.360 | 103 | 109 |
| 24 | (Ba$_{0.2494}$Ca$_{0.0006}$Mg$_{0.65}$Eu$_{0.10}$)O.2.3Al$_2$O$_3$.0.0025SiO$_2$ | 25 | (La$_{0.6}$Ce$_{0.2}$Tb$_{0.2}$)$_2$O$_3$.4.0(Mg$_{0.999}$Ca$_{0.001}$)O.11.5[(Al$_2$O$_3$)$_{0.9993}$(SiO$_2$)$_{0.0007}$] | 45 | (Y$_{0.970}$Eu$_{0.030}$)$_2$O$_3$ | 30 | x = 0.340 y = 0.354 | x = 0.342 y = 0.357 | 101 | 111 |
| 25 | (Ba$_{0.5495}$Ca$_{0.0005}$Mg$_{0.40}$Eu$_{0.05}$)O.3.2AlO$_3$.0.0008SiO$_2$ | 0.4 | (Gd$_{0.6}$Ce$_{0.3}$Tb$_{0.1}$)$_2$O$_3$.2.0(Mg$_{0.995}$Ca$_{0.005}$)O.5.0[(Al$_2$O$_3$)$_{0.9996}$(SiO$_2$)$_{0.0004}$] | 39.8 | (Y$_{0.970}$Eu$_{0.030}$)$_2$O$_3$ | 59.8 | x = 0.483 y = 0.464 | x = 0.484 y = 0.467 | 109 | 110 |
| 26 | (Ba$_{0.2}$Ca$_{0.0013}$Mg$_{0.7087}$Eu$_{0.09}$)O.2.9Al$_2$O$_3$.0.0027SiO$_2$ | 0.3 | (Y$_{0.6}$Ce$_{0.3}$Tb$_{0.1}$)$_2$O$_3$.1.5(Mg$_{0.998}$Ca$_{0.002}$)O.13[(Al$_2$O$_3$)$_{0.9992}$(SiO$_2$)$_{0.0008}$] | 40.9 | (Y$_{0.975}$Eu$_{0.025}$)$_2$O$_3$ | 58.8 | x = 0.482 y = 0.465 | x = 0.485 y = 0.468 | 110 | 112 |
| 27 | (Ba$_{0.5}$Ca$_{0.0017}$Mg$_{0.4903}$Eu$_{0.08}$)O.1.6Al$_2$O$_3$.0.0016SiO$_2$ | 0.2 | (Ce$_{0.75}$Tb$_{0.25}$)$_2$O$_3$.2.5(Mg$_{0.996}$Ca$_{0.004}$)O.6.0[(Al$_2$O$_3$)$_{0.9998}$(SiO$_2$)$_{0.0002}$] | 39.9 | (Y$_{0.980}$Eu$_{0.020}$)$_2$O$_3$ | 59.9 | x = 0.484 y = 0.464 | x = 0.487 y = 0.466 | 111 | 110 |
| 28 | (Ba$_{0.3982}$Ca$_{0.0018}$Mg$_{0.5}$Eu$_{0.10}$)O.4.0Al$_2$O$_3$ | 0.5 | (La$_{0.6}$Tb$_{0.4}$)$_2$O$_3$.2.0(Mg$_{0.999}$Ca$_{0.001}$) | 40.0 | (Y$_{0.950}$Eu$_{0.050}$)$_2$O$_3$ | 59.5 | x = 0.483 y = 0.463 | x = 0.484 y = 0.466 | 112 | 111 |

TABLE 2-continued

| No. | Blue Phosphor Composition | Blue Phosphor Mixing Ratio (% by weight) | Green Phosphor Composition | Green Phosphor Mixing Ratio (% by weight) | Red Phosphor Composition | Red Phosphor Mixing Ratio (% by weight) | Emitted Color After 0 hrs. (x, y color Representation) | Emitted Color After 500 hrs. (x, y color Representation) | Total Luminous Flux After 0 hrs. (%) | Total Luminous Flux After 500 hrs. (%) |
|---|---|---|---|---|---|---|---|---|---|---|
| | | | $0.2.5[(Al_2O_3)_{0.9995}(SiO_2)_{0.0005}]$ | | | | | | | |
| 29 | $(Ba_{0.2585}Ca_{0.0015}Mg_{0.70}Eu_{0.04})O.3.4Al_2O_3.0.0030SiO_2$ | 0.3 | $(Gd_{0.7}Tb_{0.3})_2O_3.3.0(Mg_{0.995}Ca_{0.005})O.5.5[(Al_2O_3)_{0.9996}(SiO_2)_{0.0004}]$ | 41.1 | $(Y_{0.965}Eu_{0.035})_2O_3$ | 58.6 | x = 0.483<br>y = 0.463 | x = 0.485<br>y = 0.467 | 110 | 108 |
| 30 | $(Ba_{0.1195}Ca_{0.0005}Mg_{0.80}Eu_{0.08})O.2.8AlO_3.0.0009SiO_2$ | 0.4 | $(La_{0.6}Gd_{0.1}Gd_{0.2}Tb_{0.1})_2O_3.4.5(Mg_{0.997}Ca_{0.003})O.7.0[(Al_2O_3)_{0.9997}(SiO_2)_{0.0003}]$ | 40.8 | $(Y_{0.950}Eu_{0.050})_2O_3$ | 58.8 | x = 0.482<br>y = 0.465 | x = 0.485<br>y = 0.469 | 109 | 108 |
| 31 | $(Ba_{0.4588}Ca_{0.0012}Mg_{0.45}Eu_{0.09})O.4.4Al_2O_3.0.0013SiO_2$ | 0.3 | $(La_{0.5}Gd_{0.1}Ce_{0.2}Tb_{0.2})_2O_3.5.0(Mg_{0.999}Ca_{0.001})O.14[(Al_2O_3)_{0.9991}(SiO_2)_{0.0009}]$ | 39.9 | $(Y_{0.945}Eu_{0.055})_2O_3$ | 59.8 | x = 0.482<br>y = 0.462 | x = 0.484<br>y = 0.465 | 110 | 110 |
| Control 3 | $3(Sr_{0.98}Eu_{0.02}O).0.92 P_2O_5.0.33 CaCl_2.0.08 B_2O_3$ | 19 | $(La_{0.1}Tb_{0.2}Ce_{0.697}Li_{0.003})_2O_3.0.9P_2O_5.0.2SiO_2$ | 44 | $(Y_{0.950}Eu_{0.050})_2O_3$ | 37 | x = 0.340<br>y = 0.354 | x = 0.360<br>y = 0.365 | 100 | 100 |

Table 3 shows the emission outputs (total luminous fluxes) of fluorescent lamps, obtained by coating the blue, green, and red phosphors of Example 17 on the inner surfaces of different glass bulbs, immediately after manufacture (after the lamps had been ON for 0 hours) and after the lamps had been ON for 500 hours. The rates of degradation in emission output of the respective phosphors of Example 17 are smaller than those of the respective phosphors used in the conventional fluorescent lamp (Control 4), and the rates of degradation in emission output of the respective colors are similar. This illustrates clearly that a decrease in total luminous flux and color deviation of a three-wavelength range fluorescent lamp are small, after the lamp has been is use.

TABLE 3

| Emitted Color | | Mixing Ratio (% by weight) | Emission Output After 0 hrs. (Relative Value) (%) For Each Color | Emission Output After 500 hrs. |
| --- | --- | --- | --- | --- |
| Blue | $(Ba_{0.3}Ca_{0.002}Mg_{0.6}Eu_{0.098})$ $O.2.5Al_2O_3.0.00300SiO_2$ | 15 | 100 | 95 |
| Green | $(La_{0.5}Ce_{0.3}Tb_{0.2})_2O_3 \cdot$ $2.0(Mg_{0.999}Ca_{0.001})O.8.0[(AlO_3)$ $0.9996(SiO_2)_{0.0004}]$ | 50 | 100 | 96 |
| Red | $(Y_{0.960}Eu_{0.040})_2O_3$ | 35 | 100 | 98 |
| Blue | $3(Sr_{0.98}Eu_{0.02}O).0.92P_2O_5.$ $0.33CaCl_2.0.08B_2O_3$ | 19 | 100 | 83 |
| Green | $(La_{0.1}Tb_{0.2}Ce_{0.697}$ $Li_{0.003})_2O_3.0.9P_2O_5.0.2SiO_2$ | 44 | 100 | 88 |
| Red | $(Y_{0.950}Eu_{0.050})_2O_3$ | 37 | 100 | 98 |

Table 4 shows the results obtained when the respective phosphors of Table 3 were removed from the corresponding fluorescent lamps and the reflectances of the lamps were measured. The phosphors of Example 17 have higher reflectances than those of Control 4. This is attributable to the following fact.

In a conventional fluorescent lamp, a reaction occurs therein between a conventional phosphor and mercury for excitation during use of the lamp. This degrades the phosphor, resulting in a lower reflectance. Since the reflectance degrades in a similar manner as the emission output does, it is assumed that a degradation in reflectance causes a degradation in emission output.

TABLE 4

| Emitted Color | Composition | Reflectance After 0 hrs. (Relative Value) (%) | Reflectance After 500 hrs. (Relative Value) (%) |
| --- | --- | --- | --- |
| Example 17 | | | |
| Blue | Same as Table 1 | 107 | 103 |
| Green | | 100 | 95 |
| Red | | 103 | 98 |
| Control 4 | | | |
| Blue | | 105 | 92 |
| Green | | 101 | 90 |
| Red | | 103 | 98 |
| | $BaSO_4$ | 100 | 100 |

What is claimed is:

1. A blue emitting phosphor represented by a general formula $(Ba_wCa_xMg_yEu_z)O.aAl_2O_3 \cdot bSiO_2$ where $0.1 \leq w \leq 0.5$, $0.0004 \leq x \leq 0.0020$, $0.1 \leq y \leq 0.8$, $0.03 \leq z \leq 0.10$, $w+x+y+z=1$, $1.5 \leq a \leq 4.5$, and $0.0005 \leq b \leq 0.0030$.

2. A phosphor according to claim 1, wherein $2.0 \leq a \leq 3.0$, or $0.0006 \leq x \leq 0.0015$.

3. A fluorescent lamp comprising a phosphor film on an inner surface of a glass bulb, wherein said phosphor film contains a mixture of:

a blue emitting first phosphor represented by a general formula $(Ba_wCa_xMg_yEu_z)O.aAl_2O_3.bSiO_2$ where $0.1 \leq w \leq 0.5$, $0.0004 \leq x \leq 0.0020$, $0.1 \leq y \leq 0.8$, $0.03 \leq z \leq 0.10$, $w+x+y+z=1$, $1.5 \leq a \leq 4.5$, and $0.0005 \leq b \leq 0.0030$;

a green emitting second phosphor represented by a general formula $Ln_2O_3.c(Mg_{1-u}Ca_u)O.d[(Al_2O_3)_{1-v}(SiO_2)_v]$ (where Ln is at least one element selected from the group consisting of lanthanum, gadolinium, yttrium, cerium, and terbium, and $1.5 \leq c \leq 5.0$, $2.5 \leq d \leq 14.0$, $0.001 \leq u \leq 0.005$, and $0.0002 \leq v \leq 0.0010$); and a red emitting third phosphor represented by a general formula $(Y_{1-t}Eu_t)_2O_3$ (where $0.020 \leq t \leq 0.065$), the first, second, and third phosphors being contained in ratios of 0.2 to 35% by weight, 35 to 60% by weight, and 30 to 60% by weight, respectively, with respect to 100% by weight of the mixture.

* * * * *